US012596709B2

(12) United States Patent
Barrow et al.

(10) Patent No.: US 12,596,709 B2
(45) Date of Patent: Apr. 7, 2026

(54) MACHINE LEARNING RECOLLECTION AS PART OF QUESTION ANSWERING USING A CORPUS

(71) Applicant: Adobe Inc., San Jose, CA (US)

(72) Inventors: Joseph D. Barrow, Alexandria, VA (US); Darrell Jan Dykstra, Calgary (CA); Varun Manjunatha, College Park, MD (US); Nedim Lipka, Campbell, CA (US)

(73) Assignee: Adobe Inc., San Jose, CA (US)

( * ) Notice: Subject to any disclaimer, the term of this patent is extended or adjusted under 35 U.S.C. 154(b) by 10 days.

(21) Appl. No.: 18/533,620

(22) Filed: Dec. 8, 2023

(65) Prior Publication Data

US 2025/0053562 A1     Feb. 13, 2025

Related U.S. Application Data

(60) Provisional application No. 63/518,060, filed on Aug. 7, 2023.

(51) Int. Cl.
| | |
|---|---|
| *G06F 16/24* | (2019.01) |
| *G06F 16/2452* | (2019.01) |
| *G06F 16/248* | (2019.01) |
| *G06N 3/0455* | (2023.01) |

(52) U.S. Cl.
CPC ...... *G06F 16/24522* (2019.01); *G06F 16/248* (2019.01); *G06N 3/0455* (2023.01)

(58) Field of Classification Search
CPC ........... G06F 16/24522; G06F 16/248; G06N 3/0455

USPC .......................................................... 707/722
See application file for complete search history.

(56) References Cited

U.S. PATENT DOCUMENTS

| | | | | |
|---|---|---|---|---|
| 6,195,631 B1 * | 2/2001 | Alshawi | .................. | G06F 40/45 704/4 |
| 7,962,479 B2 * | 6/2011 | Jones | .................. | G06F 16/3325 707/999.006 |
| 8,214,387 B2 * | 7/2012 | King | .................. | G06Q 20/4012 358/448 |
| 9,613,317 B2 * | 4/2017 | Beamon | ................. | G06N 5/022 |
| 10,380,144 B2 * | 8/2019 | Vermeulen | ............ | G06F 16/245 |
| 10,713,519 B2 * | 7/2020 | Bui | ........................ | G06Q 10/06 |

(Continued)

OTHER PUBLICATIONS

Gao, Luyu , et al., "Precise Zero-Shot Dense Retrieval without Relevance Labels", Cornell University, arXiv Preprint, arxiv.org [retrieved Dec. 27, 2023]. Retrieved from the Internet <https://arxiv.org/pdf/2212.10496.pdf>, Dec. 20, 2022, 11 pages.

(Continued)

*Primary Examiner* — Hanh B Thai
(74) *Attorney, Agent, or Firm* — FIG. 1 Patents

(57) ABSTRACT

Machine learning recollection techniques are described as part of question answering using a corpus. Inputs are received identifying a search query and a corpus of search data that is to be searched based on the search query. The search query is decomposed to form a plurality of decomposed queries and retrieval search results are generated by searching the corpus of search data using one or more additional terms based on the decomposed queries. A search result is synthesized based on the retrieval search results using a text generation machine-learning model. The search result is presented for display in a user interface.

20 Claims, 9 Drawing Sheets

(56) References Cited

U.S. PATENT DOCUMENTS

| | | | |
|---|---|---|---|
| 11,645,289 B2* | 5/2023 | Helvik | G06F 16/24578 |
| | | | 707/749 |
| 11,755,559 B1* | 9/2023 | Tankersley | G06F 16/2358 |
| | | | 707/694 |
| 11,860,914 B1* | 1/2024 | Qadrud-Din | G06F 40/289 |
| 11,861,321 B1* | 1/2024 | O'Kelly | G06F 16/33 |
| 11,921,759 B1* | 3/2024 | Riva | G06F 16/325 |
| 11,972,223 B1* | 4/2024 | DeFoor | G06N 20/00 |
| 12,073,180 B2* | 8/2024 | Tunstall-Pedoe | G06F 40/279 |
| 2002/0002450 A1* | 1/2002 | Nunberg | G06F 40/30 |
| | | | 707/E17.09 |
| 2004/0073541 A1* | 4/2004 | Lindblad | G06F 16/81 |
| 2004/0208374 A1* | 10/2004 | Lee | G06V 10/7515 |
| | | | 382/209 |
| 2005/0086256 A1* | 4/2005 | Owens | G06F 16/284 |
| 2006/0147105 A1* | 7/2006 | Lee | G06V 10/752 |
| | | | 382/151 |
| 2007/0143110 A1* | 6/2007 | Acero | G10L 15/05 |
| | | | 704/251 |
| 2008/0166014 A1* | 7/2008 | Marcus | G06T 7/162 |
| | | | 382/103 |
| 2010/0106704 A1* | 4/2010 | Josifovski | G06F 40/58 |
| | | | 704/7 |
| 2010/0145956 A1* | 6/2010 | Shi | G06F 16/313 |
| | | | 707/E17.022 |
| 2010/0205172 A1* | 8/2010 | Luk | G06F 16/334 |
| | | | 707/742 |
| 2012/0005148 A1* | 1/2012 | Horvitz | G06N 20/00 |
| | | | 706/50 |
| 2012/0233151 A1* | 9/2012 | Vanderwende | G06F 16/954 |
| | | | 707/769 |
| 2013/0138633 A1* | 5/2013 | Dettinger | G06F 16/24534 |
| | | | 707/722 |
| 2014/0280087 A1* | 9/2014 | Isensee | G06F 16/24578 |
| | | | 707/723 |
| 2014/0297571 A1* | 10/2014 | Beamon | G06F 16/313 |
| | | | 706/46 |
| 2014/0298199 A1* | 10/2014 | Johnson, Jr. | G06Q 10/101 |
| | | | 715/753 |
| 2014/0358922 A1* | 12/2014 | Alkov | G06F 16/3329 |
| | | | 707/737 |
| 2014/0358928 A1* | 12/2014 | Alkov | G06N 5/041 |
| | | | 707/738 |
| 2014/0359421 A1* | 12/2014 | Allen | G06F 40/169 |
| | | | 715/230 |
| 2014/0365502 A1* | 12/2014 | Haggar | G06N 5/02 |
| | | | 707/748 |
| 2015/0026169 A1* | 1/2015 | Brown | G06F 16/24578 |
| | | | 707/723 |
| 2015/0161230 A1* | 6/2015 | Alkov | G06F 16/24578 |
| | | | 707/748 |
| 2016/0078102 A1* | 3/2016 | Crouch | G06F 16/313 |
| | | | 707/722 |
| 2016/0078182 A1* | 3/2016 | Allen | G16H 50/20 |
| | | | 702/19 |
| 2016/0203208 A1* | 7/2016 | Anderson | G06F 16/353 |
| | | | 707/738 |
| 2016/0217209 A1* | 7/2016 | Beamon | G06F 16/24578 |
| 2016/0239740 A1* | 8/2016 | Baughman | G06N 5/04 |
| 2016/0240095 A1* | 8/2016 | Baughman | G09B 7/00 |
| 2016/0342900 A1* | 11/2016 | Allen | G06Q 10/109 |
| 2017/0220680 A1* | 8/2017 | Shattuck | G06F 16/3326 |
| 2017/0329764 A1* | 11/2017 | Beller | G06F 16/24573 |
| 2017/0351677 A1* | 12/2017 | Chaubal | G06F 16/248 |
| 2018/0024901 A1* | 1/2018 | Tankersley | G06Q 10/06393 |
| | | | 707/694 |
| 2018/0025280 A1* | 1/2018 | Beller | G06F 16/24522 |
| | | | 706/58 |
| 2019/0026255 A1* | 1/2019 | Rix | G06F 40/284 |
| 2019/0294691 A1* | 9/2019 | Bortnikov | G06F 16/93 |
| 2021/0064822 A1* | 3/2021 | Velikovich | G10L 15/083 |
| 2021/0149963 A1* | 5/2021 | Agarwal | G06F 16/90332 |
| 2021/0174448 A1* | 6/2021 | Kotarinos | G06Q 40/04 |
| 2021/0240707 A1* | 8/2021 | Fischer | G06F 16/252 |
| 2022/0319065 A1* | 10/2022 | Kumawat | G06V 10/82 |
| 2023/0061244 A1* | 3/2023 | Wei | G06T 11/001 |
| 2023/0070302 A1* | 3/2023 | Kovacs | G06F 40/58 |
| 2023/0237271 A1* | 7/2023 | Ferrucci | G16H 70/60 |
| | | | 707/726 |
| 2023/0297398 A1* | 9/2023 | Ferrucci | G06F 16/248 |
| 2023/0401467 A1* | 12/2023 | Ferrucci | G06F 16/3329 |
| 2024/0096125 A1* | 3/2024 | Yebes Torres | G06N 3/042 |
| 2024/0126993 A1* | 4/2024 | Cheng | G06N 3/09 |
| 2024/0184974 A1* | 6/2024 | Burris | G06F 16/35 |
| 2024/0265124 A1* | 8/2024 | Frattura | G06F 21/6218 |
| 2025/0045304 A1* | 2/2025 | Quatro | G06N 20/00 |
| 2025/0093164 A1* | 3/2025 | Carbune | G06N 3/0455 |
| 2025/0307256 A1* | 10/2025 | Ma | G06F 16/24578 |

OTHER PUBLICATIONS

Pereira, Jayr , "Visconde: Multi-document QA with GPT-3 and Neural Reranking", Cornell University, arXiv Preprint, arxiv.org [retrieved Dec. 27, 2023]. Retrieved from the Internet <https://arxiv.org/pdf/2212.09656.pdf>, Dec. 19, 2022, 11 pages.

Yao, Shunyu , et al., "ReAct: Synergizing Reasoning and Acting in Language Models", Cornell University, arXiv Preprint, arxiv.org [retrieved Dec. 27, 2023]. Retrieved from the Internet <https://arxiv.org/pdf/2210.03629.pdf>, Oct. 6, 2022, 33 pages.

* cited by examiner

200

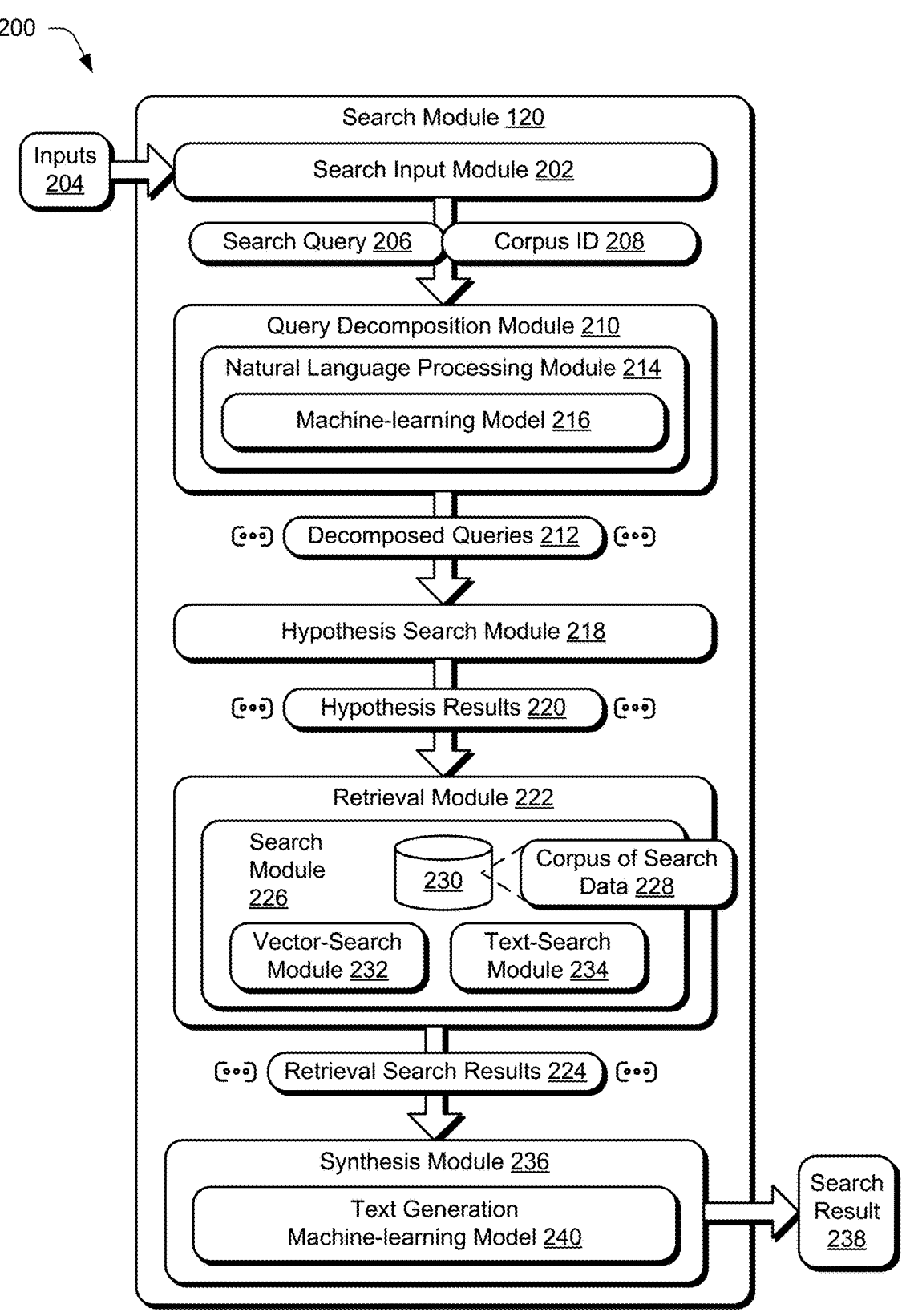

Search Module 120

Inputs 204

Search Input Module 202

Search Query 206    Corpus ID 208

Query Decomposition Module 210

Natural Language Processing Module 214

Machine-learning Model 216

Decomposed Queries 212

Hypothesis Search Module 218

Hypothesis Results 220

Retrieval Module 222

Search Module 226    230    Corpus of Search Data 228

Vector-Search Module 232    Text-Search Module 234

Retrieval Search Results 224

Synthesis Module 236

Text Generation Machine-learning Model 240

Search Result 238

Figure 5:
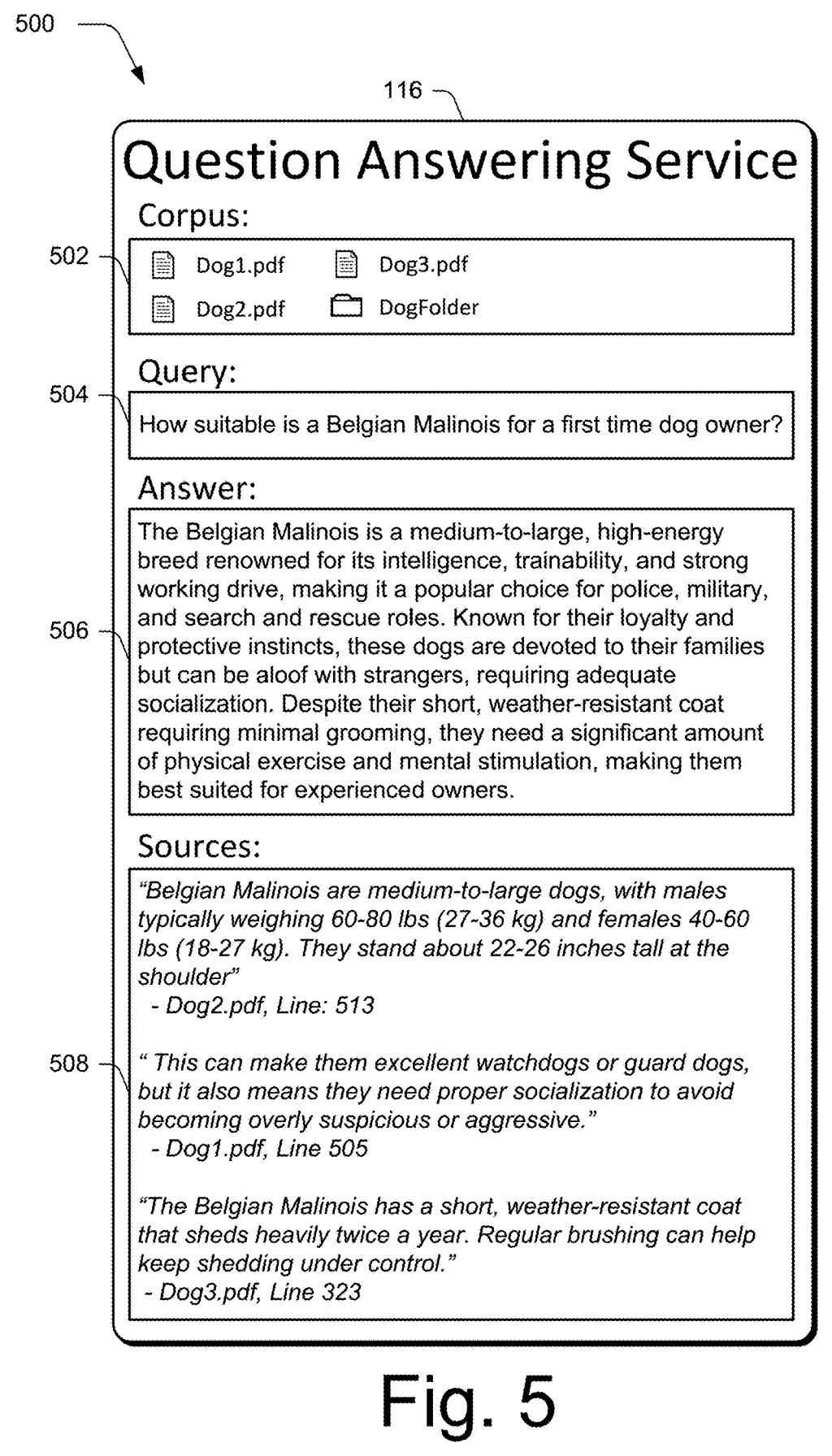

Question Answering Service

Corpus:

502

📄 Dog1.pdf    📄 Dog3.pdf

📄 Dog2.pdf    📁 DogFolder

Query:

504

How suitable is a Belgian Malinois for a first time dog owner?

Answer:

506

The Belgian Malinois is a medium-to-large, high-energy breed renowned for its intelligence, trainability, and strong working drive, making it a popular choice for police, military, and search and rescue roles. Known for their loyalty and protective instincts, these dogs are devoted to their families but can be aloof with strangers, requiring adequate socialization. Despite their short, weather-resistant coat requiring minimal grooming, they need a significant amount of physical exercise and mental stimulation, making them best suited for experienced owners.

Sources:

508

*"Belgian Malinois are medium-to-large dogs, with males typically weighing 60-80 lbs (27-36 kg) and females 40-60 lbs (18-27 kg). They stand about 22-26 inches tall at the shoulder"*
  *- Dog2.pdf, Line: 513*

*" This can make them excellent watchdogs or guard dogs, but it also means they need proper socialization to avoid becoming overly suspicious or aggressive."*
  *- Dog1.pdf, Line 505*

*"The Belgian Malinois has a short, weather-resistant coat that sheds heavily twice a year. Regular brushing can help keep shedding under control."*
*- Dog3.pdf, Line 323*

Figure 6:
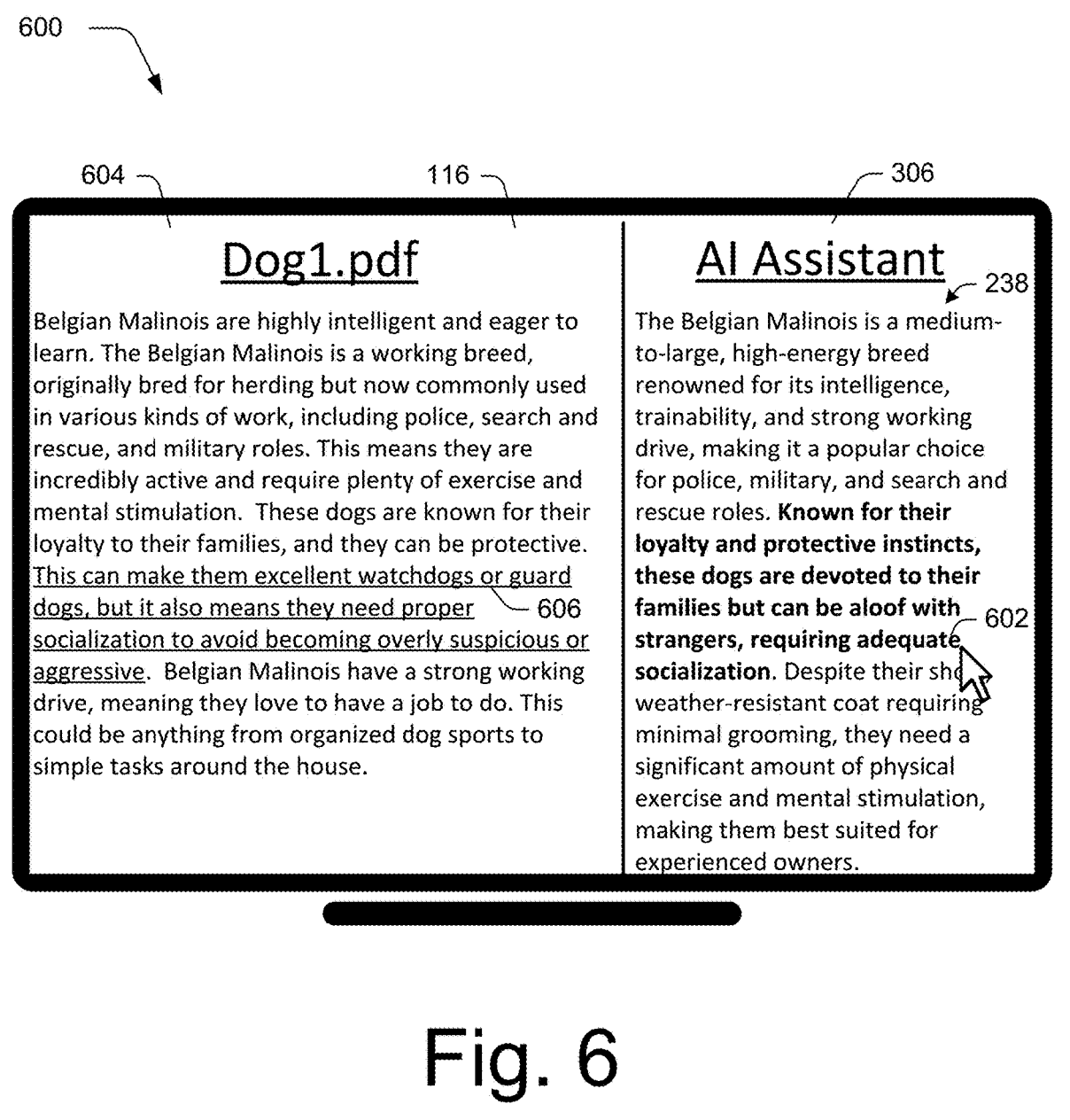

Dog1.pdf

Belgian Malinois are highly intelligent and eager to learn. The Belgian Malinois is a working breed, originally bred for herding but now commonly used in various kinds of work, including police, search and rescue, and military roles. This means they are incredibly active and require plenty of exercise and mental stimulation. These dogs are known for their loyalty to their families, and they can be protective. <u>This can make them excellent watchdogs or guard dogs, but it also means they need proper</u> ⟍ 606 <u>socialization to avoid becoming overly suspicious or aggressive.</u> Belgian Malinois have a strong working drive, meaning they love to have a job to do. This could be anything from organized dog sports to simple tasks around the house.

AI Assistant
238

The Belgian Malinois is a medium-to-large, high-energy breed renowned for its intelligence, trainability, and strong working drive, making it a popular choice for police, military, and search and rescue roles. Known for their loyalty and protective instincts, these dogs are devoted to their families but can be aloof with strangers, requiring adequate socialization. Despite their sh⟨o⟩rt weather-resistant coat requiring minimal grooming, they need a significant amount of physical exercise and mental stimulation, making them best suited for experienced owners.

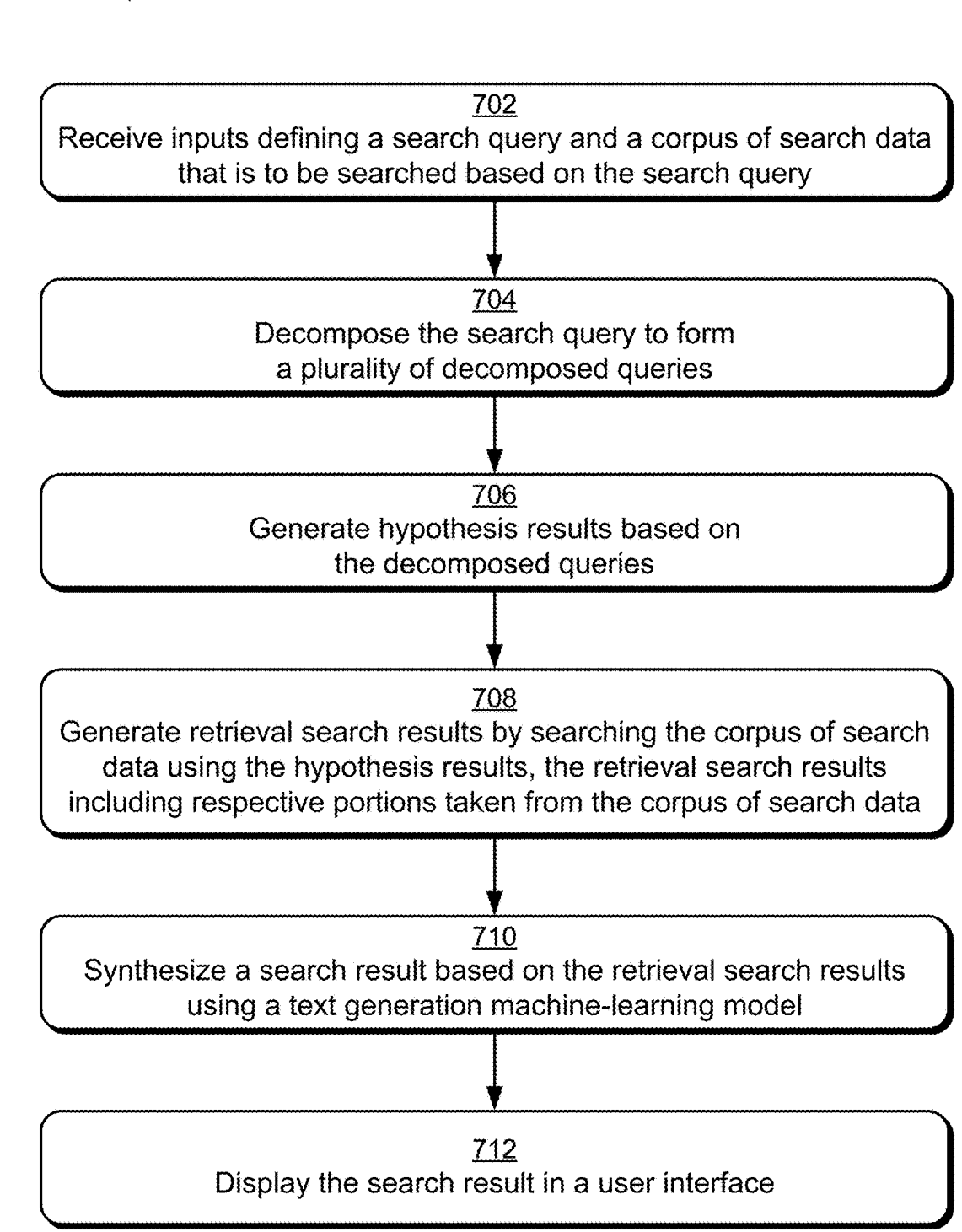

702
Receive inputs defining a search query and a corpus of search data
that is to be searched based on the search query 704
Decompose the search query to form
a plurality of decomposed queries 706
Generate hypothesis results based on
the decomposed queries 708
Generate retrieval search results by searching the corpus of search
data using the hypothesis results, the retrieval search results
including respective portions taken from the corpus of search data 710
Synthesize a search result based on the retrieval search results
using a text generation machine-learning model 712
Display the search result in a user interface

Platform 916

Resources 918

Cloud
914

Computing Device 902

Processing
Device 904

Hardware
Elements 910

Computer-readable
Media 906

Memory/
Storage 912

I/O
Interfaces 908

Search Module 120

MACHINE LEARNING RECOLLECTION AS PART OF QUESTION ANSWERING USING A CORPUS

RELATED APPLICATIONS

This application claim priority under 35 U.S.C. § 119 (e) to U.S. Provisional Patent Application No. 65/518,060, filed Aug. 7, 2023, and titled "Machine Learning Recollection as part of Question Answering using a Corpus," the entire disclosure of which is hereby incorporated by reference.

BACKGROUND

Search techniques are one of the primary mechanisms available to users to locate information of interest. Search techniques are usable, for instance, to locate a particular item of digital content from a multitude of digital content, such as to locate a particular digital image, a webpage on the internet, and so forth.

Subsequent techniques have been developed to expand a richness of search techniques to provide automated insights as part of a search result. Conventional techniques to do so, however, often operate "behind the scenes" and provide limited awareness into how those insights are generated. Therefore, usefulness of these insights is inadequate for use in many real-world scenarios due to a lack of trust caused by this limited awareness.

SUMMARY

Machine learning recollection techniques are described as part of question answering using a corpus. These techniques support use of a multistep approach to question answering (QA) for a corpus of search data, e.g., a collection of one or more digital documents. In one or more examples, a user interface is output that is configured to receive a search query and identify a corpus of search data that is to be a subject of the search performed using the search query.

In response, a search module decomposes the search query into decomposed search queries. A hypothesis search module is then employed to generate hypothesis results that hypothesize answers to the decomposed queries. A retrieval module is employed to generate retrieval search results by searching the corpus of search data (e.g., the selected digital documents) based on the hypothesis results. The retrieval search results, including the portions of the corpus of search data, are then passed as an input to a synthesis module of the search module to generate a search result as an answer to the search query. The synthesis module is configured to recombine the retrieval search results and decomposed queries to synthesize an answer to the search result.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 2 depicts a system in an example implementation showing operation of a search module of FIG. 1 in greater detail as generating a search result.

FIG. 5 depicts an example implementation of a user interface supporting display of the search result.

FIG. 6 depicts an example implementation of a user interface supporting display of the search result.

FIG. 7 is a flow diagram depicting an algorithm as a step-by-step procedure in an example implementation of operations performable for accomplishing a result of generating a search result as part of question answering using a machine-learning model.

DETAILED DESCRIPTION

Overview

Figure 1:
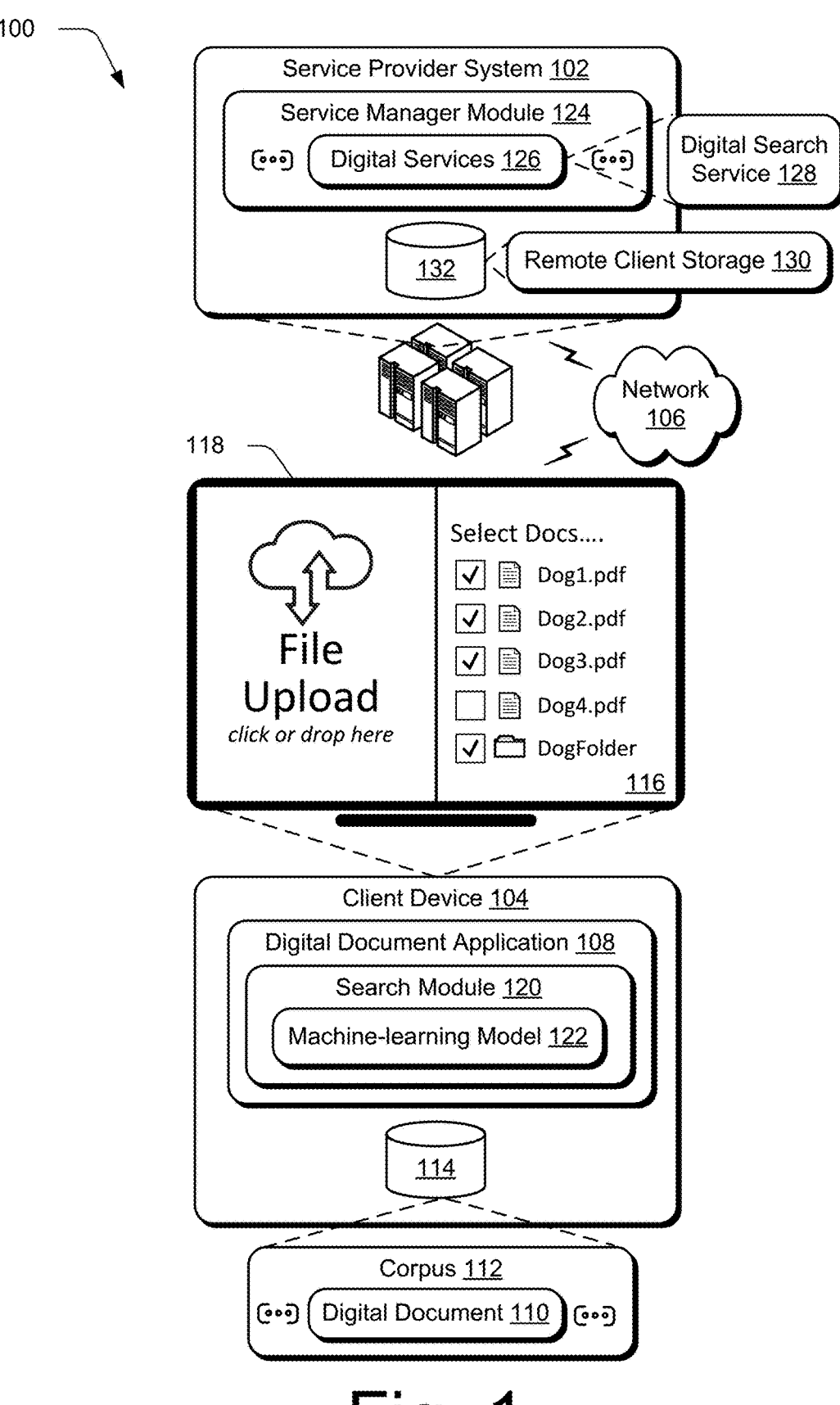
FIG. 1 is an illustration of a digital medium environment in an example implementation that is operable to employ machine learning recollection techniques as part of question answering using a corpus as described herein.

Machine learning has expanded a richness of search techniques beyond locating items of interest to also supporting automated insight based on a search query. However, conventional techniques to do so in real world scenarios often fail and are inaccurate due to the source used for the information and provide limited awareness into how the insight is generated. Accordingly, conventional techniques and insights generated by those techniques have limited trustworthiness due to these inaccuracies. The limited trustworthiness and an inability of a user to rely on the insights results in inefficient use of computational resources, power consumption, and decreased user efficiency involved in continued interaction to address these technical challenges.

Accordingly, machine learning recollection techniques are described as part of question answering using a corpus that overcome the technical problems encountered by conventional mechanisms. These techniques support use of a multistep approach to question answering (QA) for a corpus of search data, e.g., a collection of one or more digital documents. These techniques also provide for source attribution and support an ability to compare and contrast ideas across different collections, which is not possible in conventional techniques.

In one or more examples, a user interface is output that is configured to receive a search query, e.g., as text. The user interface is also configured to receive inputs to identify a corpus of search data that is to be a subject of the search performed using the search query. Inputs are received, for instance, that select digital documents (e.g., in a portable document format or other format) that are to be used as a basis to perform a search. In this way, a user is given a degree of control as to a source of insights that are to be obtained, which is not possible in conventional techniques.

In response, a search module (e.g., implemented locally at a computing device or "in the cloud" as part of a digital service) decomposes the search query into decomposed search queries. A search query of "compare and contrast a poodle with a bulldog," for instance, is decomposed using a query decomposition module into decomposed queries of "what are the characteristics of a poodle" and "what are the characteristics of a bulldog." The query decomposition module may be implemented in a variety of ways, such as to leverage natural language processing using a machine-learning model.

A hypothesis search module is then employed to generate hypothesis results that hypothesize answers to the decomposed queries. Continuing with the above example, the hypothesis results include "Poodles are versatile dogs that are hypoallergenic due to their non-shedding coat and makes them suitable for people with allergies" for the poodle decomposed query. Likewise, the hypothesis results for the bulldog decomposed query include "Bulldogs are brachycephalic meaning they have a flattened face, are notorious for snoring, and drool." The hypothesis results are therefore usable to hypothesize additional relevant terms based on the search query and decomposition of the search query to be used for a search.

A retrieval module is then employed to generate retrieval search results by searching the corpus of search data (e.g., the selected digital documents) based on the hypothesis results. The retrieval module is configurable to perform the search in a variety of ways, e.g., a vector-based search in an embedding space, a text-based search, and so forth. The retrieval search results include portions of the corpus of search data (e.g., the digital documents) that are located as corresponding to the search. The retrieval search results are also configurable to cite to relevant portions of the corpus of search data, e.g., a document name and location of the portion.

The retrieval search results including the portions of the corpus of search data are then passed as an input to a synthesis module of the search module to generate a search result as an answer to the search query. The synthesis module is configured to process the retrieval search results using a text generation machine-learning model to provide insights based on the portions of the corpus of search data located in the search. The synthesis module, for instance, is tasked with recombining the retrieval search results and decomposed queries to synthesize an answer to the search result. The text generation machine-learning model is configurable in a variety of ways to perform the synthesis. An example of which includes use of a generative pretrained transform architecture that is trained using text and configured to predict a series of tokens representing individual pieces of text.

The synthesized search result is then displayed by the search module in a user interface by a display device. The user interface, for instance, is configurable to include representations of a corpus used as a basis to generate the search result, the search query, and the search result that is synthesized as an answer to the search query.

The user interface is also configurable to include representations of sources used to generate the search result. The representations of the sources, for instance, include portions of the corpus included in the retrieval search results. The representations also include corresponding cites identifying a respective digital document and where in the digital document the portion may be located. The representations of the sources, in one or more implementations, are user selectable to navigate to a respective source (e.g., digital document) nonmodally in the user interface, thereby improving user efficiency and promoting trust in the search result.

In this way, the search module overcomes limitations of conventional search techniques. Other examples are also contemplated, including generation of decomposed query search results based on the decomposed queries to generate the hypothesis results, use of document summarization as part of generating the retrieval search results, and so on. Further discussion of these and other examples is included in the following discussion and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Search Environment

FIG. 1 is an illustration of a digital medium environment 100 in an example implementation that is operable to employ machine learning recollection techniques as part of question answering using a corpus as described herein. The illustrated environment 100 includes a service provider system 102 and a client device 104 that are communicatively coupled, one to another, via a network 106. Computing devices that implement the service provider system 102 and the client device 104 are configurable in a variety of ways.

A computing device, for instance, is configurable as a desktop computer, a laptop computer, a mobile device (e.g., assuming a handheld configuration such as a tablet or mobile phone), and so forth. Thus, a computing device ranges from full resource devices with substantial memory and processor resources (e.g., personal computers, game consoles) to a low-resource device with limited memory and/or processing resources (e.g., mobile devices). Additionally, although a single instance of a computing device is described, a computing device is also representative of a plurality of different devices, such as multiple servers utilized by a business to perform operations "over the cloud" as described in FIG. 9.

The client device 104 is illustrated as including a digital document application 108. The digital document application 108 is implemented at least partially in hardware of the client device 104 to process and transform a digital document 110, which is illustrated as included as part of a corpus 112 that is maintained in a storage device 114 of the client device 104. Such processing includes creation of the digital document 110, modification of the digital document 110, and rendering of digital document 110 in a user interface 116 for output, e.g., by a display device 118.

The digital document application 108 is illustrated including a search module 120 configured to implement search techniques using a machine-learning module 122. The search techniques are configurable to support location of particular items as well as rich functionality including question answer techniques. In the question answer techniques, a search query is received as a natural language input (e.g., using text, text converted from a spoken utterance, and so forth) and a result is generated as an answer generated based on the corpus 112 in this example using the machine-learning module 122.

Although functionality of the search module 120 is illustrated as implemented locally at the client device 104, functionality of the search module 120 is also configurable as whole or part via functionality available via the network 106, e.g., by the service provider system 102.

The service provider system 102, for instance, includes a service manager module 124 that is configured to manage execution of digital services 126 that are accessible to client devices via the network 106. An example of one such digital service includes a digital search service 128. The digital search service 128 is also configurable to implement search techniques to locate particular items as well as rich functionality including question answer techniques.

The digital search service 128, for instance, includes a remote client storage 130 implemented in a storage device 132. The remote client storage 130 is "sandboxed" in one or more examples such that data maintained therein is not exposed nor is accessible to other entities without being granted permission by the client. Accordingly, the search techniques described herein may also be implemented by the service provider system 102 without compromising security of the data contained within the remote client storage 130, e.g., such as to train a machine-learning model used to implement the digital search service 128. Other examples are also contemplated in which user permissions are used to control access to data in the remote client storage 130 by the service provider system 102.

Therefore, although the following discussion includes examples of implementation of the search techniques locally at the client device 104, these techniques are equally applicable for implementation by the service provider system 102. Further discussion of these and other examples is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Example Search Techniques in Question Answering

The following discussion describes examples of question-and-answer techniques that are implementable utilizing the described systems and devices to implement question answering using machine learning. Aspects of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform algorithm. In portions of the following discussion, reference will be made in parallel to FIG. 7, which is a flow diagram depicting an algorithm 700 as a step-by-step procedure in an example implementation of operations performable for accomplishing a result of generating a search result as part of question answering using a machine-learning model.

FIG. 2 depicts a system 200 in an example implementation showing operation of the search module 120 of FIG. 1 in greater detail as generating a search result. To begin in this example, a search input module 202 receives inputs identifying a search query 206 and identifies a corpus of search data that is to be searched based on the search query (block 702), which is illustrated as a corpus ID 208. The search input module 202, for instance, outputs a user interface 116 via which the inputs 204 are received, an example of which is described below.

Figure 3:
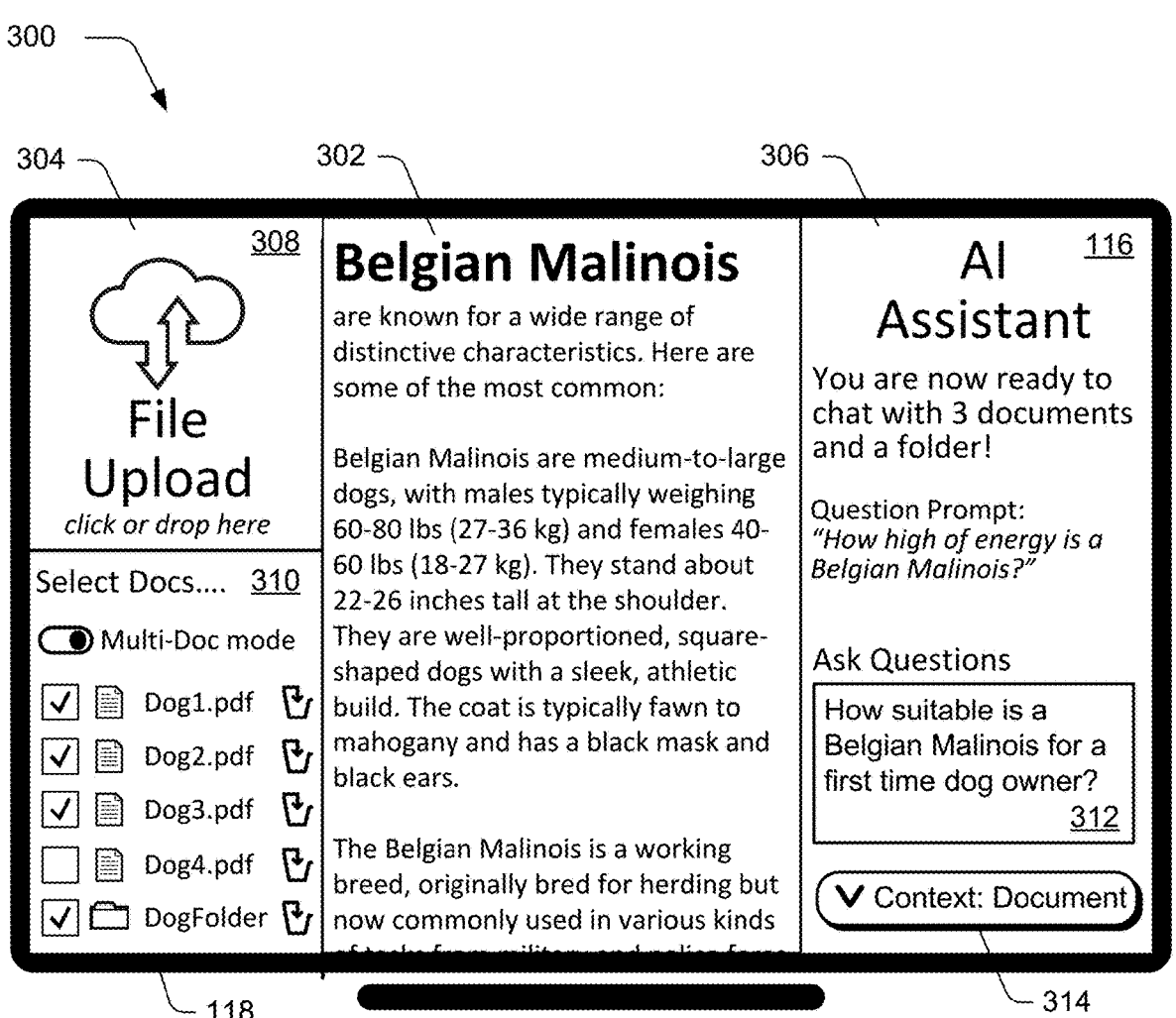
FIG. 3 depicts an example implementation of output of a user interface configured to receive inputs identifying a search query and identifying a corpus of search data.

FIG. 3 depicts an example implementation 300 of output of a user interface 116 configured to receive inputs identifying a search query and identifying a corpus of search data. The user interface 116 is output due to execution of the digital document application 108 by the display device 118 of the client device 104 and includes a display of a digital document in a center pane 302 of the user interface 116.

First and second side panels 304, 306 are also output in the user interface 116 responsive to a request to interact with an artificial intelligence (AI) assistant, such as in response to a gesture, selection in a menu, spoken utterance, and so forth. In the first side panel 304, an option 308 is provided to upload files, e.g., digital documents. The files, for instance, may be uploaded to the storage device 114 local to the client device 104 and/or the remote client storage 130 implemented by the storage device 132 at the service provider system 102. The first side panel also includes a portion 310 including representations of items that are to be included as part of the corpus 112 of search data. In the illustrated example, the portion 310 indicates respective documents, including a representation of a folder having items that are also to be included as part of the corpus 112.

The second side panel 306 is configured to indicate, using text, items that are selected for inclusion in the corpus 112, e.g., "you are now ready to chat with 3 documents and a folder." The second side panel 306 also includes a question prompt to indicate a type of search query that is enterable to initiate a search. In an implementation, the prompt is generated automatically and without user intervention using natural language understanding as implemented by a machine learning model based on the corpus 112, e.g., as a generalized query based on a summary of the corpus 112.

The second side panel 312 also includes a portion that is configured to receive the search query 206, e.g., as text specifying "How suitable is a Belgian Malinois for a first time dog owner?" for the search query 206. An additional option 314 is also included to indicate a context to be used for an answer to the search query, e.g., to generate an answer to the search query 206 as suitable for inclusion in a document.

Returning again to FIG. 2, the search query 206 and the corpus ID 208 are then provided as an input to a query decomposition module 210. The query decomposition module 210 is configured to decompose the search query 206 to form a plurality of decomposed queries 212 (block 704). The decomposed queries 212 are configurable as simplified questions (e.g., as a simplification to a single topic) for a corresponding part of the search query 206.

The query decomposition module 210 is configured to employ a variety of techniques in order to decompose the search query 206. A natural language processing module 214, for instance, employs a machine-learning model 216 to break down the complex question into simpler sub-questions as the decomposed queries 212. To do so, the machine-learning model 216 is trained using training data by a training dataset of complex questions and corresponding simpler sub-questions, e.g., using a sequence-to-sequence model.

Training complex questions of the training data are first tokenized into individual words or sub-words as representative of a vector of numbers. The machine-learning model 216 is then trained to predict a sequence of output embeddings as a tokenized sequence, which is converted back into a sequence of words that form the decomposed queries 212. Further discussion of an example of machine-learning model training is described in relation to FIG. 8. A variety of other examples are also contemplated, including use of constraint satisfaction techniques that group variables into sets of binary constraints that form a directed acyclic graph.

The decomposed queries 212 are then used as a basis by a hypothesis search module 218 to generate hypothesis results 220 (block 706), e.g., as specifying additional terms to be searched. The hypothesis search module 218 is configurable to employ a variety of techniques to do so. In a first example, a query expansion technique is performed by the hypothesis search module 218. The hypothesis search module 218, for instance, is configurable to locate semantically related text to text included in the decomposed queries 212 (e.g., synonyms, antonyms), morphological forms of the text, and so on. In this way, the hypothesis search module 218 expands the decomposed queries 212 to locate additional terms to be searched.

In a second example, the hypothesis results 220 are generated by the hypothesis search module 218 using a blind relevance feedback technique as applied to the decomposed queries 212. To do so, a threshold number of top ranked search results are returned in response to a search query initiated using the decomposed queries 212. The top ranked search results are used to locate additional terms to be searched as part of the decomposed queries 212. This technique is "blind," in that explicit feedback is not utilized but rather based on an assumption that the threshold number of search results are relevant to the decomposed queries 212 when used as part of a search.

In a third example, the hypothesis results 220 are generated by the hypothesis search module 218 using a reformulation technique. In reformulation, the hypothesis search module 218 is tasked with adding, changing, or deleting terms in the decomposed queries 212 to form the hypothesis results 220. Techniques to do so include natural language processing techniques including part-of-speech tagging, dependency parsing, and name entity recognition.

The reformulation techniques, for instance, include reordering and/or substitution of terms in the decomposed queries 212. Reformulation techniques also support removal of terms that hinder accuracy in generating the hypothesis results 220, e.g., terms in the hypothesis search module 218 that detract from accuracy of the hypothesis results 220. A variety of other examples are also contemplated of generation of the hypothesis results 220, automatically and without intervention, by the hypothesis search module 218.

The hypothesis results 220 are then passed as an input to a retrieval module 222. The retrieval module 222 is configured to generate retrieval search results 224 by searching the corpus of search data 228 using the hypothesis results 220.

The search data 228 is illustrated as maintained in a storage device 230 that may correspond to storage device 114 and/or storage device 132 of FIG. 2. The retrieval search results 224 include respective portions taken from the corpus of search data 228 (block 708). The retrieval module 222 is configurable to perform the search in a variety of ways, examples of functionality to do so are illustrated as a vector-search module 232 and a text-search module 234.

The vector-search module 232 is configured to perform a search using embeddings in an embedding space. The hypothesis results 220 and the corpus of search data 228, for instance, are transformed into vectors. The vector-search module 232 then determines "how close" the hypothesis results 220 are to respective vectors of the search data 228, e.g., based on a comparison using cosine similarity. Results of the comparison are ranked, and portions of the corpus of search data 228 are included in the retrieval search results 224 based on the ranking, along with cites to respective items taken from the corpus of search data 228, e.g., to identify a respective digital document and location from within the digital document that the portion is taken.

In another example, the text-search module 234 is configured to perform a text-based search in which text included in the hypothesis results 220 is used as a query (e.g., as part of a keyword search) to search the corpus of search data 228 to locate corresponding portions. Like the previous example, the portions are included in the retrieval search results 224 along with cites identifying "where" in the corpus of search data 228 the portions are obtained. The cites therefore identify a source of the portions and thus an answer generated based on the retrieval search results 224 as further described below.

The retrieval search results 224 are received as an input by a synthesis module 236 to synthesize a search result 238 using a text generation machine-learning model 240 (block 710). The text generation machine-learning model 240, for instance, is configurable as a transformed model architecture as a generative pretrained transformer that is configured to generate text based on an input. The text generation machine-learning model 240, for instance, generates tokens to represent words or portions of words in the input, e.g., the retrieval search results 224. The tokens are then processed in order by generating a context that includes each of the tokens in the sequence before it.

The text generation machine-learning model 240 employs a plurality of layers for processing each of the tokens and its context to generate vectors representing hidden states. The text generation machine-learning model 240 then calculates a probability of candidate tokens and selects a token based on these probabilities. The tokens are then decoded to form readable text as the search result 238. In this way, the search module 120 is configured to provide additional insight and control of how those insights are generated based on an ability to control a source of the insights. Additional techniques may be employed to further increase accuracy of the search module 120 in generating the search result 238, an example of which is described as follows and shown in a corresponding figure.

Figure 4:
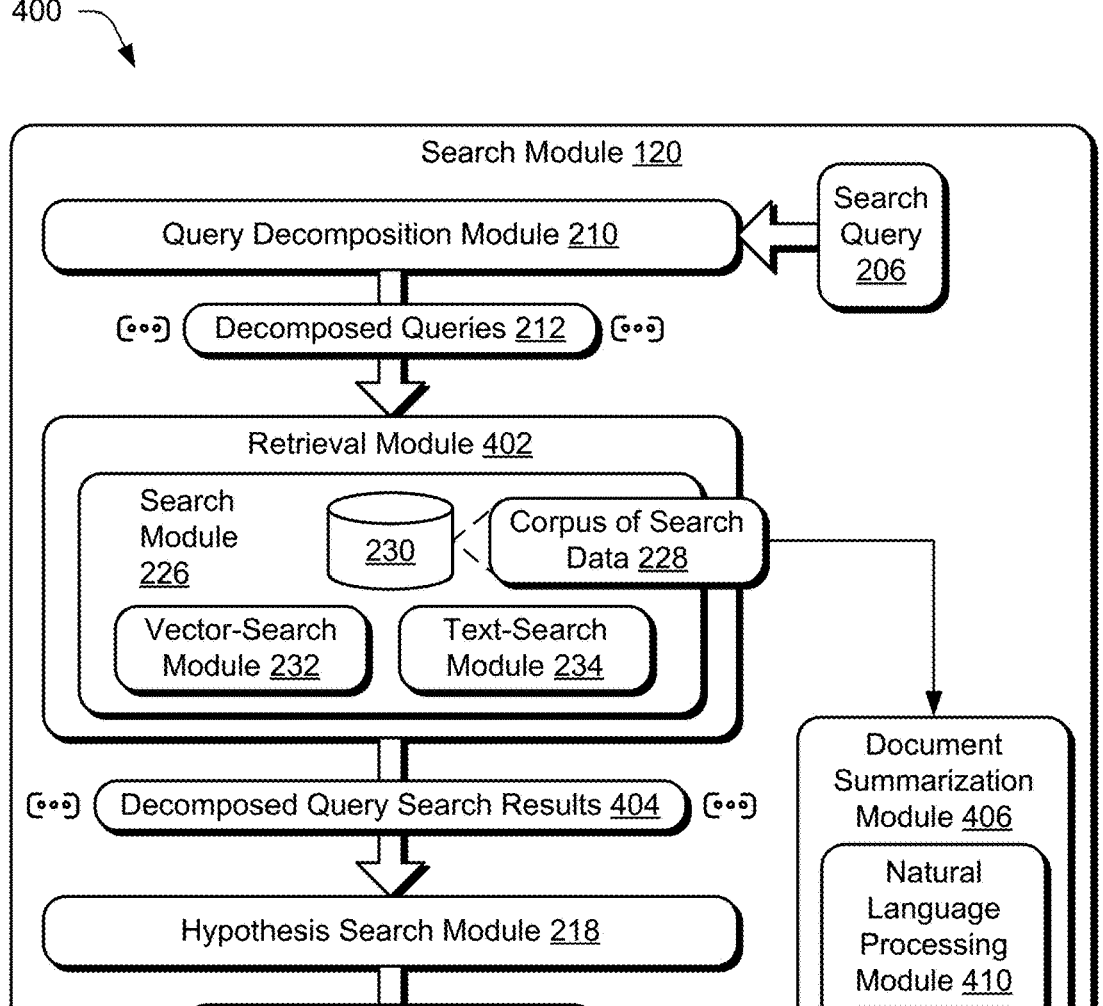
FIG. 4 depicts a system in an example implementation showing operation of the search module of FIG. 1 in greater detail as generating a search result as employing decomposed query search results and document summaries.

FIG. 4 depicts a system 400 in an example implementation showing operation of the search module 120 of FIG. 1 in greater detail as generating a search result as employing decomposed query search results and document summaries. The system 400, like the system 200 of FIG. 2, includes a query decomposition module 210 configured to generate decomposed queries 212 from the search query 206. The hypothesis search module 218 is also configured to generate hypothesis results 220, which are used as a basis by the retrieval module 222 to generate retrieval search results 224 that are synthesized by the synthesis module 236 to generate the search result 238.

In this example, however, a retrieval module 402 is employed to generate decomposed query search results 404 based on the decomposed queries 212. Generation of the hypothesis results 220 by the hypothesis search module 218 is then based on the decomposed query search results 404. In this way, the decomposed query search results 404 specify additional terms to be searched. The retrieval module 402, for instance, is configurable to leverage the search module 226 as previously described that supports a search of a corpus of search data 228, e.g., using a vector-search module 232 and/or a text-search module 234. In practice, use of the decomposed query search results 404 (which may be employed by the hypothesis search module 218 as instead of or in addition to the decomposed queries 212) improves accuracy of the hypothesis results 220.

In another example, a document summarization module 406 is configured to generate document summaries 408 from the corpus of search data 228, e.g., using a natural language processing module 410 implemented using a machine-learning model 412. Generation of the search result 238 by the synthesis module 236 is then based on the document summaries 408 as well as the retrieval search results 224. In practice, it has also been shown to increase accuracy of the search result 238. The search result 238 is then presented for display in the user interface 116 (block 712), which may be performed in a variety of ways, examples of which are described as follows.

FIG. 5 depicts an example implementation 500 of a user interface 116 supporting display of the search result 238. The user interface 116 includes representations 502 of digital documents included in the corpus of search data, representations 504 of the search query, representations 506 of the search result 238, and a portion 508 including representations of portions of the corpus of search data used as a source of the search result and cites to the portions.

FIG. 6 depicts an example implementation 600 of a user interface 116 supporting display of the search result 238. The search result 238 in this example is displayed in a second side panel 306 of the user interface 116 nonmodally in response to entry of the search query as shown in FIG. 3. The search result 238 supports a selection 602 of text included in the search result 238. The selection 602 causes output of a corresponding source, e.g., a document 604, nonmodally in the user interface 116. The display of the document 604 includes a corresponding portion 606 (e.g., the retrieval search result 224) that is a source of the selection 602. In this way, the display of the search result 238 in the user interface 116 improves navigation efficiency and insight into how the search result 238 is generated.

Figure 8:
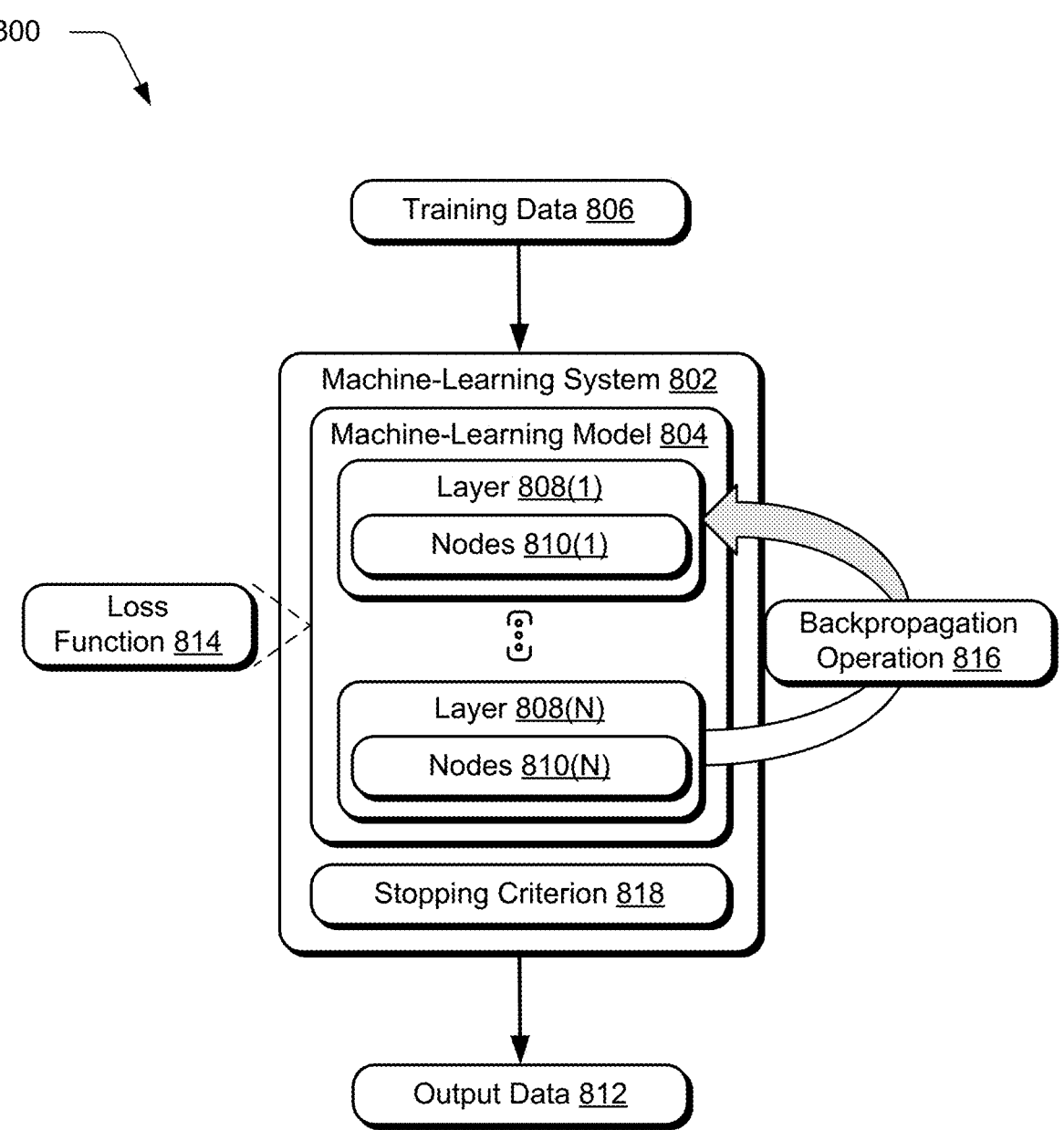
FIG. 8 depicts a system in an example implementation showing training of a machine-learning model of FIG. 1 in greater detail.

FIG. 8 depicts a system 800 in an example implementation showing training of a machine-learning model 122 of FIG. 1 in greater detail. A machine-learning system 802 is illustrated as implementing a machine-learning model 804. The machine-learning system 802 is representative of functionality to generate training data 806, use the generated training data 806 to train the machine-learning model 804, and/or use the trained machine-learning model 804 as implementing the functionality described herein.

A machine-learning model 804 refers to a computer representation that is tunable (e.g., through training and retraining) based on inputs without being actively programmed by a user to approximate unknown functions, automatically and without user intervention. In particular, the term machine-learning model includes a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, generative adversarial networks (GANs), decision trees, support vector machines, linear regression, logistic regression, Bayesian networks, random forest learning, dimensionality reduction algorithms, boosting algorithms, deep learning neural networks, etc.

In the illustrated example, the machine-learning model 804 is configured using a plurality of layers 808(1), . . . , 808(N) having, respectively, a plurality of nodes 810(1), . . . , 810(N). The plurality of layers 808(1)-811(N) are configurable to include an input layer, an output layer, and one or more hidden layers. Calculations are performed by the nodes 810(1)-810(N) within the layers via hidden states through a system of weighted connections that are "learned" during training of the machine-learning model 804 to implement a variety of tasks.

In order to train the machine-learning model 804, training data 806 is received that provides examples of "what is to be learned" by the machine-learning model 804, i.e., as a basis to learn patterns from the data. The machine-learning system 802, for instance, collects and preprocesses the training data 806 that includes input features and corresponding target labels, i.e., of what is exhibited by the input features. The machine-learning system 802 then initializes parameters of the machine-learning model 804, which are used by the machine-learning model 804 as internal variables to represent and process information during training and represent interferences gained through training. In an implementation, the training data 806 is separated into batches to improve processing and optimization efficiency of the parameters of the machine-learning model 804 during training.

The training data 806 is then received as an input by the machine-learning model 804 and used as a basis for generating predictions based on a current state of parameters of layers 808(1)-808(N) and corresponding nodes 810(1)-810(N) of the model, a result of which is output as output data 812. Output data 812 describes an outcome of the task, e.g., as a probability of being a member of a particular class in a classification scenario.

Training of the machine-learning model 804 includes calculating a loss function 814 to quantify a loss associated with operations performed by nodes of the machine-learning model 804. The calculating of the loss function 814, for instance, includes comparing a difference between predictions specified in the output data 812 with target labels specified by the training data 806. The loss function 814 is configurable in a variety of ways, examples of which include regret, Quadratic loss function as part of a least squares technique, and so forth.

Calculation of the loss function 814 also includes use a backpropagation operation 816 as part of minimizing the loss function 814 and thereby training parameters of the machine-learning model 804. Minimizing the loss function 814, for instance, includes adjusting weights of the nodes 810(1)-810(N) in order to minimize the loss and thereby optimize performance of the machine-learning model 804 in performance of a particular task. The adjustment is determined by computing a gradient of the loss function 814, which indicates a direction to be used in order to adjust the parameters to minimize the loss. The parameters of the machine-learning model 804 are then updated based on the computed gradient.

This process continues over a plurality of iteration in an example until a stopping criterion 818 is met. The stopping criterion 818 is employed by the machine-learning system 802 in this example to reduce overfitting of the machine-learning model 804, reduce computational resource consumption, and promote an ability of the machine-learning model 804 to address previously unseen data, i.e., that is not included specifically as an example in the training data 806. Examples of a stopping criterion 818 include but are not limited to a predefined number of epochs, validation loss stabilization, achievement of a performance improvement threshold, or based on performance metrics such as precision and recall.

Configuration of the training data 806 is usable to support a variety of usage scenarios. In one example, the training data 806 is configured as a training dataset of complex questions and corresponding simpler sub-questions to train the machine-learning model 216. In another example, the training data is obtained via webpages of the internet, such as to train the text generation machine-learning model 240 of FIG. 2.

Example System and Device

Figure 9:
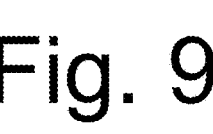
FIG. 9 illustrates an example system including various components of an example device that can be implemented as any type of computing device as described and/or utilize with reference to the previous figures to implement embodiments of the techniques described herein.

FIG. 9 illustrates an example system generally at 900 that includes an example computing device 902 that is representative of one or more computing systems and/or devices that implement the various techniques described herein. This is illustrated through inclusion of the search module 120. The computing device 902 is configurable, for example, as a server of a service provider, a device associated with a client (e.g., a client device), an on-chip system, and/or any other suitable computing device or computing system.

The example computing device 902 as illustrated includes a processing device 904, one or more computer-readable media 906, and one or more I/O interface 908 that are communicatively coupled, one to another. Although not shown, the computing device 902 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 904 is representative of functionality to perform one or more operations using hardware. Accordingly, the processing device 904 is illustrated as including hardware element 910 that is configurable as processors, functional blocks, and so forth. This includes implementation in hardware as an application specific integrated circuit or other logic device formed using one or more semiconductors. The hardware elements 910 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

One-or-more computer-readable storage media 906 is illustrated as including memory/storage 912 that stores instructions that are executable to cause the processing device 904 to perform operations. The memory/storage 912 represents memory/storage capacity associated with one or more computer-readable media. The memory/storage 912 includes volatile media (such as random access memory (RAM)) and/or nonvolatile media (such as read only memory (ROM), Flash memory, optical disks, magnetic disks, and so forth). The memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 902. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 910. The computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing device 904. The instructions and/or functions are executable/operable by one or more articles of manufacture (for example, one or more computing devices 902 and/or processing devices 904) to implement techniques, modules, and examples described herein.

The techniques described herein are supported by various configurations of the computing device 902 and are not limited to the specific examples of the techniques described herein. This functionality is also implementable all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 include applications and/or data that can be utilized while computer processing is executed on servers that are remote from the computing device 902. Resources 918 can also include services provided over the Internet and/or through a subscriber network, such as a cellular or Wi-Fi network.

The platform 916 abstracts resources and functions to connect the computing device 902 with other computing devices. The platform 916 also serves to abstract scaling of resources to provide a corresponding level of scale to encountered demand for the resources 918 that are implemented via the platform 916. Accordingly, in an interconnected device embodiment, implementation of functionality described herein is distributable throughout the system 900.

For example, the functionality is implementable in part on the computing device 902 as well as via the platform 916 that abstracts the functionality of the cloud 914.

In implementations, the platform 916 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

receiving, by a processing device, inputs identifying a search query and a corpus of search data that is to be searched based on the search query;

decomposing, by the processing device, the search query using a generative machine-learning model trained to form first generated text including a plurality of decomposed queries;

synthesizing, by the processing device, a search result using the generative machine-learning model further trained to form second generated text based on a plurality of search results obtained from a search of the corpus of search data using a plurality of terms of the plurality of decomposed queries and one or more additional terms from a reformulation of the plurality of terms, the second generated text including readable text describing the search result and supported by citations to portions of the corpus of search data used as sources for the readable text; and presenting, by the processing device, the readable text describing the search result for display in a user interface including the citations to the portions of the corpus of search data used as the sources.

2. The method as described in claim 1, wherein the plurality of decomposed queries is is formed using a question decomposition technique implemented using natural language processing by the generative machine-learning model.

3. The method as described in claim 1, wherein the one or more additional terms are formed based further on a query expansion technique applied to the plurality of decomposed queries.

4. The method as described in claim 1, wherein the one or more additional terms are formed based further on a blind relevance feedback technique applied to the plurality of decomposed queries.

5. The method as described in claim 1, wherein one or more of:

the reformulation reorders the plurality of terms;

the reformulation further substitutes at least one term from the plurality of terms with at least one additional term from the one or more additional terms; and

the reformulation removes the at least one term from the plurality of terms.

6. The method as described in claim 1, wherein the search of the corpus of search data is performed using embeddings as part of a vector-based search utilizing an embedding space.

7. The method as described in claim 1, wherein the search of the corpus of search data is performed using text of one or more additional terms as part of a text-based search.

8. The method as described in claim 1, further comprising: generating, using the generative machine-learning model, third generated text as document summaries of digital documents included as part of the corpus of search data for the search.

9. The method as described in claim 1, wherein the generative machine-learning model is configured using a generative pretrained transform architecture to predict a series of tokens representing individual pieces of the first generated text and the second generated text.

10. The method as described in claim 1, wherein the presenting includes displaying representations in the user interface of digital documents included in the corpus of search data, the search query, the search result, the portions of the corpus of search data used as the sources, and the citations to the portions.

11. The method of claim 1, further comprising: training the generative machine-learning model based on: first training data to decompose the search query for the corpus of search data into the first generated text that includes the plurality of decomposed queries; and second training data to synthesize the search result based on the search query into the second generated text supported by the citations to the portions of the corpus of search data used as the sources.

12. The method of claim 11, the training further comprising: training the generative machine-learning model based further on third training data to generate document summaries of digital documents included as part of the corpus of search data during the search.

13. A system comprising: a search input module implemented by a processing device to receive inputs identifying a search query and a corpus of search data that is to be searched based on the search query; a query decomposition module implemented by the processing device to decompose the search query to form a plurality of decomposed queries into first generated text using a generative machine-learning model; a hypothesis search module implemented by the processing device to generate hypothesis results specifying one or more additional terms to be searched based on a reformulation that reorders a plurality of terms of the plurality of decomposed queries; a retrieval module implemented by the processing device to generate retrieval search results by searching the corpus of search data using the plurality of terms and the one or more additional terms based on the plurality of decomposed queries; a synthesis module implemented by the processing device to synthesize a search result into second generated text using the generative machine-learning model based on the retrieval search results, the second generated text including readable text supported by citations to portions of the corpus of search data used as sources for the readable text, and the search input module is further implemented by the processing device to present the readable text of the search result in a user interface that displays a portion of the corpus of search data used as a source for a portion of the readable text identified from a user selection in the user interface.

14. The system as described in claim 13, wherein the retrieval search results include respective portions taken from the corpus of search data.

15. The system as described in claim 13, further comprising a document summarization module implemented by the processing device using the generative machine-learning model to generate third generated text as document summaries of digital documents included as part of the corpus of search data, wherein the search result is synthesized based further on the document summaries.

16. The system of claim 13, wherein the generative machine-learning model is configured using a generative pretrained transform architecture to predict a series of tokens representing individual pieces of the first generated text and the second generated text.

17. One-or-more computer-readable storage media storing instructions that, responsive to execution by a processing device, causes the processing device to perform operations including:
   receiving inputs defining a search query using text and one or more digital documents for inclusion as part of a corpus of search data;
   decomposing the search query to form a plurality of decomposed queries into first generated text using a generative machine-learning model;
   generating hypothesis results specifying one or more additional terms to be searched based on a reformulation that reorders a plurality of terms of the plurality of decomposed queries;
   generating retrieval search results by searching the corpus of search data using the plurality of terms and the one or more additional terms based on the plurality of decomposed queries;
   synthesizing a search result into second generated text using the generative machine-learning model based on the retrieval search results, the second generated text including readable text supported by citations to portions of the corpus of search data used as sources for the readable text; and
   presenting the readable text of the search result in a user interface that displays a portion of the corpus of search data used as a source for a portion of the readable text identified from a user selection in the user interface.

18. The one-or-more computer-readable storage media as described in claim 17, wherein the generative machine-learning model is configured using a generative pretrained transform architecture to predict a series of tokens representing individual pieces of the first generated text and the second generated text.

19. The one-or-more computer-readable storage media as described in claim 17, the operations further including training the generative machine-learning model based on:
   first training data to decompose the search query for the corpus of search data into the first generated text that includes the plurality of decomposed queries; and
   second training data to synthesize the search result based on the search query into the second generated text including the readable text supported by the citations to the portions of the corpus of search data used as the sources.

20. The one-or-more computer-readable storage media as described in claim 19, the training further including:

training the generative machine-learning model based further on third training data to generate document summaries of digital documents included as part of the corpus of search data during the searching.

\* \* \* \* \*